US009715463B2

(12) United States Patent
Bhooma et al.

(10) Patent No.: US 9,715,463 B2
(45) Date of Patent: *Jul. 25, 2017

(54) PROTECTION SCHEME FOR EMBEDDED CODE (71) Applicant: Synopsys, Inc., Mountain View, CA (US)

(72) Inventors: Pranab Bhooma, Mountain View, CA (US); Carlos Basto, Mountain View, CA (US); Kulbhushan Kalra, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,859

(22) Filed: Oct. 31, 2016

(65) Prior Publication Data

US 2017/0046282 A1  Feb. 16, 2017

Related U.S. Application Data (63) Continuation of application No. 14/421,799, filed as application No. PCT/US2013/055010 on Aug. 14, 2013, now Pat. No. 9,514,064.
(Continued)

(51) Int. Cl.
*G06F 12/14* (2006.01)
*G06F 21/52* (2013.01)
(Continued)

(52) U.S. Cl.
CPC ...... *G06F 12/1425* (2013.01); *G06F 9/30043* (2013.01); *G06F 9/3834* (2013.01);
(Continued)

(58) Field of Classification Search
CPC ............... G06F 9/3867; G06F 12/1425; G06F 12/1441; G06F 21/62
(Continued)

(56) References Cited

U.S. PATENT DOCUMENTS 5,680,581 A   10/1997  Banno et al.
6,754,784 B1   6/2004  North et al.
(Continued)

FOREIGN PATENT DOCUMENTS

CN   1717639 A   1/2006
CN   1758215 A   4/2006
(Continued)

OTHER PUBLICATIONS

Chinese First Office Action, Chinese Application No. 2013800501668, Aug. 26, 2016, 25 pages.
(Continued)

*Primary Examiner* — Gary Portka
(74) *Attorney, Agent, or Firm* — Fenwick & West LLP (57) ABSTRACT A code protection scheme for controlling access to a memory region in an integrated circuit includes a processor with an instruction pipeline that includes multiple processing stages. A first processing stage receives one or more instructions. A second processing stage receives address information identifying a protected memory region of the memory from the first processing stage and protection information for an identified protected memory region. The protection information indicates a protection state assigned to each protected memory region. Based on the instruction type of the received instruction and the protection information associated with a particular protected memory region, the second processing stage determines whether to enable or disable access to the particular protected memory region by the processor or other external host.

18 Claims, 5 Drawing Sheets

Related U.S. Application Data (60) Provisional application No. 61/683,645, filed on Aug. 15, 2012.

(51) Int. Cl.
*G06F 21/71* (2013.01)
*G06F 21/78* (2013.01)
*G06F 21/79* (2013.01)
*G06F 9/30* (2006.01)
*G06F 9/38* (2006.01)
*G06F 21/62* (2013.01)

(52) U.S. Cl.
CPC ............ *G06F 9/3867* (2013.01); *G06F 21/52* (2013.01); *G06F 21/62* (2013.01); *G06F 21/71* (2013.01); *G06F 21/78* (2013.01); *G06F 21/79* (2013.01); *G06F 2212/1052* (2013.01)

(58) Field of Classification Search
USPC .................................. 711/152, 163, 164, 169
See application file for complete search history.

(56) References Cited

U.S. PATENT DOCUMENTS

| | | |
|---|---|---|
| 2006/0156033 A1 | 7/2006 | Desmicht et al. |
| 2006/0168485 A1 | 7/2006 | Jusufovic et al. |
| 2009/0070885 A1 | 3/2009 | Mersh |
| 2009/0210644 A1 | 8/2009 | Batifoulier et al. |
| 2012/0036308 A1 | 2/2012 | Swanson et al. |
| 2012/0102334 A1 | 4/2012 | O'Loughlin et al. |
| 2012/0191933 A1 | 7/2012 | Zbiciak et al. |
| 2013/0326288 A1 | 12/2013 | Datta et al. |

FOREIGN PATENT DOCUMENTS

| | | |
|---|---|---|
| CN | 1767618 A | 5/2006 |
| CN | 101361084 A | 2/2009 |
| CN | 103714018 A | 4/2014 |
| WO | WO 2008/032332 A1 | 3/2008 |

OTHER PUBLICATIONS

PCT International Search Report, PCT Application No. PCT/US2013/055010, Mar. 6, 2014, 17 pages.

Korean Office Action, Korean Application No. 2015-7006545, Mar. 16, 2016, 26 pages.

Chinese First Office Action, Chinese Application No. 201380050166.8, Aug. 26, 2016, 11 pages (with concise explanation of relevance).

United States Office Action, U.S. Appl. No. 14/421,799, Apr. 8, 2016, 10 pages.

Chinese Second Office Action, Chinese Application No. 201380050166.8, Apr. 26, 2017, 6 pages (with concise explanation of relevance).

PROTECTION SCHEME FOR EMBEDDED CODE

CROSS REFERENCE TO RELATED APPLICATIONS

This application is a continuation of co-pending U.S. application Ser. No. 14/421,799, with a 371(c) date of Feb. 13, 2015, which is a national stage entry of International Application No. PCT/US13/55010, filed on Aug. 14, 2013, which claims the benefit of U.S. Provisional Application No. 61/683,645, filed on Aug. 15, 2012. All of the foregoing are incorporated herein by reference in their entirety.

BACKGROUND

1. Field of Art

This disclosure relates generally to the field of embedded applications residing on a processing device.

2. Description of the Related Art

Driven by demand for more computing power in devices with ever decreasing form factors, system-on-chip (SoC) device continue to pack more functionality per die area. These highly integrated devices combine a variety of intellectual property (IP) blocks into a complex distributed computing system. These devices also include a suite of embedded software executed on multiple processor cores for performing task, such as managing power consumption, executing application level software, processing audio/video, and operating wireless transceivers.

Because these devices are highly integrated, interactions among embedded software modules and IP blocks may significantly contribute to the overall performance of the SoC device. And during development and bring-up of the SoC device, SoC providers may collaborate with several embedded software vendors to implement, test, and optimize these interactions to achieve a desired overall performance level of the SoC. But while collaboration may benefit the SoC provider, collaboration also raises concerns about how to protect against piracy and malware of embedded code among embedded software providers.

BRIEF DESCRIPTION OF THE DRAWINGS

Figure (FIG. 1) is a block diagram illustrating components of a code protection system for a processing device in a system-on-chip (SoC) device, according to one embodiment.

SUMMARY

A code protection scheme for controlling access to a memory region in an integrated circuit includes a processor with an instruction pipeline that includes multiple processing stages. A first processing stage receives one or more instructions. A second processing stage receives address information identifying a protected memory region of the memory from the first processing stage and protection information for an identified protected memory region. The protection information indicates a protection state assigned to each protected memory region. Based on the instruction type of the received instruction and the protection information associated with a particular protected memory region, the second processing stage determines whether to enable or disable access to the particular protected memory region by the processor or other external host.

DETAILED DESCRIPTION

The figures and following description depict preferred embodiments for purposes of illustration only. It should be noted that from the following discussion, alternative embodiments of the structures and methods disclosed herein will be readily recognized as viable alternatives that may be employed without departing from the principles of what is claimed.

Figure 1:
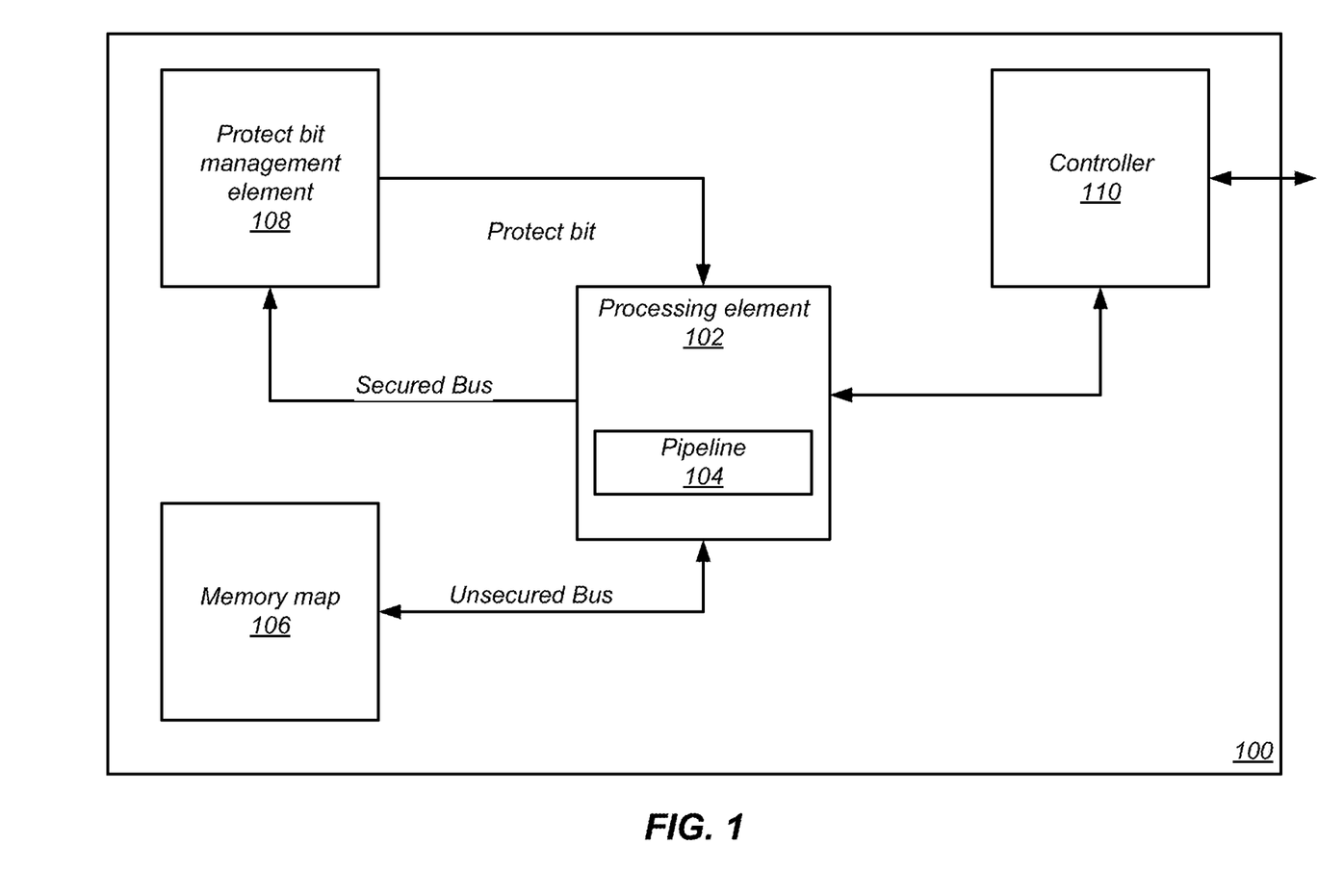

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. The figures depict embodiments of the disclosed system (or method) for purposes of illustration only. One skilled in the art will readily recognize from the following description that alternative embodiments of the structures and methods illustrated herein may be employed without departing from the principles described herein Code Protection System Architecture Figure (FIG. 1 is one embodiment of components of a code protection system for a processing device in a system-on-chip (SoC) device 100. The code protection system includes a processing element 102, a memory map 106, and a protection bit management element 108. A controller 110 is shown to demonstrate an example SoC device, and is not intended to limit the scope of the code protection system.

The processing element 102 generally includes a processing device to execute instructions (e.g., code or software). The processing element 102 may be a specialize processor in that in may be configured and programmed to operate as a reduced instruction set computing (RISC) processor, digital signal processor (DSP), graphics processor unit (GPU), applications processor (e.g., a mobile application processor), video processor, or a central processing unit (CPU) to access memory map 106, and exchange commands with the controller 110. The processing element 102 includes a pipeline 104. The pipeline 104 includes multiple data processing stages connected in series as further described with reference to FIG. 2. The pipeline 104 also includes hardware elements (e.g., combinational logic or switches) configured to implement code protection for designated memory regions accessible by the processing element 102 as further described with reference to FIG. 2.

The processing element 102 may be a single or multiple processor cores represented in an electronic format. In one example, the processing element 102 is a configurable processor core represented in circuit description language, such as register transfer language (RTL) or hardware description language (HDL). In another example the processing element 102 may be represented as a placed and routed design or design layout format (e.g., graphic data system II or GDS II). In a further example, the processing element 102 may be configured to implement code protection consistent with the methods described in this disclosure and embodied in silicon or otherwise converted into a physical device.

The memory map 106 describes a structure of data (e.g., code) that represents how a memory accessible to the processing element 102 is partitioned or organized. The memory map 106 may be coupled to the processing element 102 using an unsecured bus. In one example, the memory map 106 is partitioned into multiple regions, each region uniquely addressable by the processor element 102. Regions of the memory map 106 may be defined or designated by the processing element 102. To allow protected software to share memory with third-party unprotected software, each individual memory region may be further designated as a protected region or an unprotected region. In one example, memory regions of the memory map 106 may be designated as protected or unprotected responsive to receiving a selection of an option to configure processor element 102.

To control access to the protect regions described in the memory map 106, the code protection system further includes the protect bit management element 108. The protect bit management element 108 receives protection setting from the SoC over a secured bus and generates protection information that specifies a unique protect bit corresponding to each region of the memory map 106. In one implementation, the protect bit management element 108 is a separate controller comprised of circuit elements. In another implementation, the protect bit management element includes circuit elements shared with other portions of the integrated circuit that operates to perform the previously described functions. In one example, the protect bit is a multi-bit value, where each bit in the multi-bit value is associated with or otherwise mapped to a region specified in the memory map 106. When a bit corresponding to a region of the memory map 106 is set, load/store access to that region is not permitted, but execution of a non-load/store instruction from that region is permitted. Otherwise load/store access is not permitted. The protect bit management element 108 may specified in a register external to the intellectual property (IP) block associated with the processing element 102. The protect bit management element 108 may be configured to specify the management type (e.g, register-based, fused-based, etc.), how the protect bits are set (e.g., static or dynamic), and other protect bit management methods, including check sum and vendor selectable protect bit management. Vendor selectable protect bit management may include a user password and an SoC provider password that when received by a tool configured to configure the protection bits permit changing of the setting of the protection bits for protected regions of the memory that include code associated with that vendor. When the settings are reset by the tool, the vendor resets the password to prevent the tool from making further changes to the protect bit settings for protected regions of memory designated for that user using the previous user password.

In one embodiment, the protect bit management element 108 is a register comprised of multiple memory locations and coupled to the processing element 102 over a secured bus. Each memory location in the register corresponds to a particular region of the memory map 106. In one example, to set a protect bit, a logic high (or "1") is stored in a memory location of the register that corresponds to a particular region of the memory map 106 designated a protected region. And for a particular region of the memory map 106 designated as unprotected, a logic low (or "0") is stored in a memory location that corresponds to the particular unprotected region described in memory map 106. In another example, to set a protect bit, a logic low (or "0") is stored in a memory location of the register that corresponds to a particular region of the memory map 106 designated a protected region, and a logic high (or "1") is stored in a memory location that corresponds to a region of described in the memory map 106 that corresponds to an unprotected region. In another embodiment protect bit management element 108 may be a fused-based approach. For example, in a fused-based approach, fuses may be blown based on values stored in register, such as the register described in the register-based approach described above. A logic high (or "1") or a logic low (or "0") may be used to set a protect bit (i.e., enable a protected memory region) or clear a protect bit (i.e., to disable a protected memory region).

The protect bit management element 108 may be configured to set protect bits statically or dynamically. In one example, the protect bits are set statically using the fused-based approach during manufacturing of the SoC device. In another example, protect bits are set dynamically when the processing element 102 is in a halt or idle state, such as during instruction random access memory (RAM) loading.

The controller 110 may be any device coupled to exchange one or a combination instructions or data with the processing element 102. For example, the controller 110 may be a debug controller having a first port, such as a Joint Test Action Group (JTAG) port to connect to a debugger external to the SoC 100, and a second port coupled to the processing element 102 to execute debug software stored in a memory accessible by the processing element 102.

Figure 2:
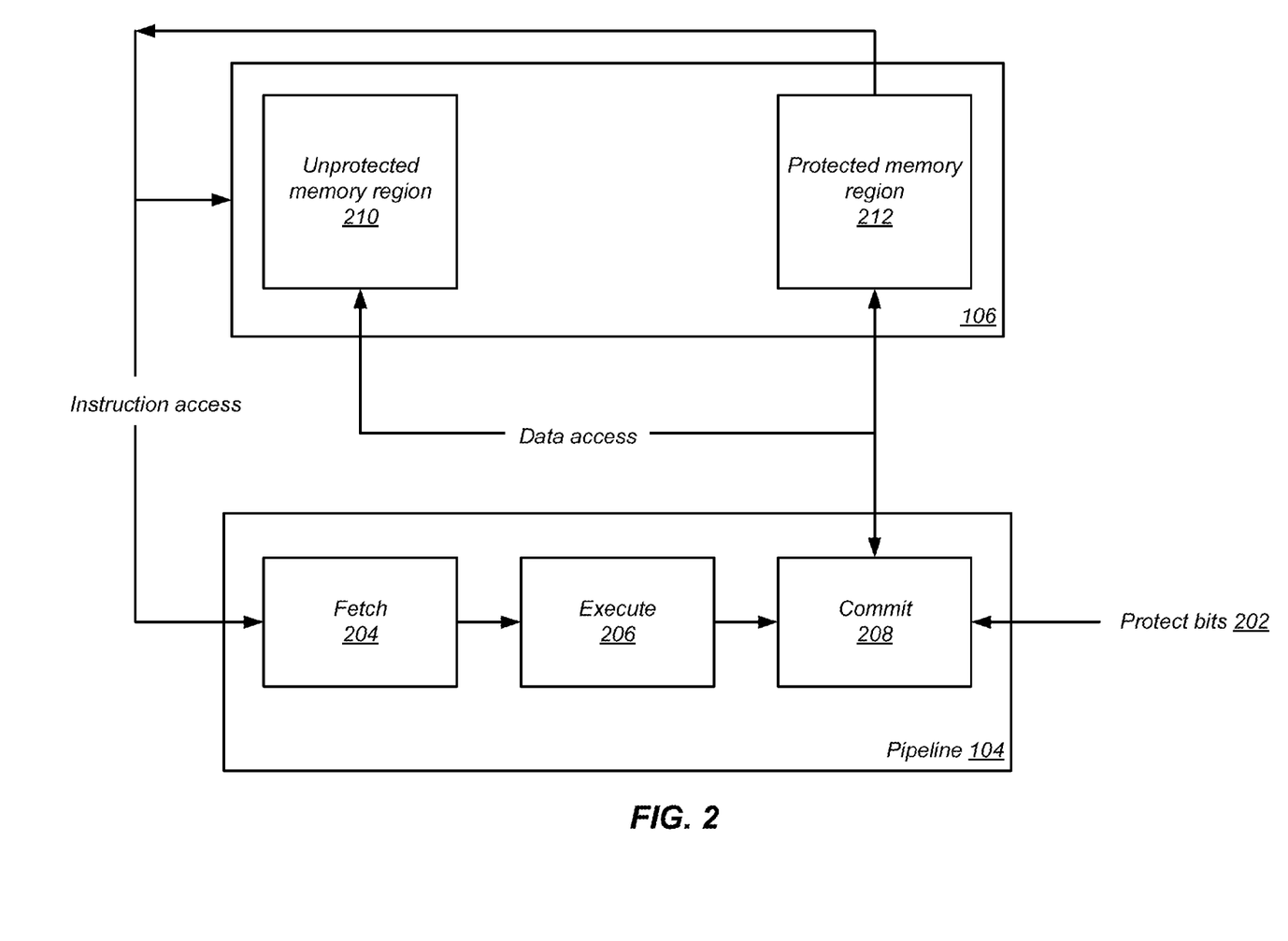
FIG. 2 illustrates in greater detail a block diagram of the functional architecture of a code protection scheme for a processing device, according to an embodiment.

FIG. 2 illustrates in greater detail a block diagram of the functional architecture of the processing element pipeline 104 and the memory space 106 of a code protection scheme for a processing device. As shown in FIG. 2, code protection is implemented in the pipeline 104. Implementing code protection in the pipeline 104 is beneficial because it provides a configurable code protection system that is area and power efficient compared to other code protection solutions for embedded processors. For example, other code protection solutions uses a dedicated separate protected memory space, which requires more area and power compared to the disclosed embodiments. Other solutions use dedicated embedded hardware that operates as a trust memory management unit (MMU) to provide code protection. The trust MMU not only consumes additional die area compared to the disclosed embodiments, but also consumes extra processing power, and burdens the design engineer with additional RTL development to implement code protection for embedded or deeply embedded processor cores.

In contrast to the other code protection solutions for embedded or deeply embedded processor cores, the code protection system of FIG. 2 integrates the operation of regulating access to a protected region of memory map 106 into the pipeline 104. As shown in FIG. 2, the pipeline 104 includes multiple processing stages coupled in series. Although three processing stages, fetch 204, execute 206, and commit 208 are shown in FIG. 2, additional processing stages may be used based on design requirements of the SoC device and the functionality of the processing element 102.

The fetch 204 stage receives and instruction access from unprotected memory region 210 or protected memory region 212. The instruction access may be a command from a controller 110, processor code, an external host, or any other source coupled to communicate with the processing element 102. For example, the instruction access may be a read, write, or execute command. The execute 206 stage receives the command associated with the instruction access processed by the fetch 204 stage and performs an operation consistent with the received instruction. For example, the execute 206 stage may perform a register-to-register operation (e.g., add, subtract, compare, or other logical operation), a multi-cycle instruction, or other operations other than load/store instructions for the protected memory region 212. The execute 206 stage may execute commands from the unprotected memory region 210 or the protected memory region 212 independent of the setting of the protect bits 202. The commit 208 stage differentiates between instruction and data memory access, and regulates memory access to regions of memory designated as protected In particular, the commit 208 stage regulates load/store access to a protected memory region 212 within the memory map 106 based on the status of a protection bit associated with the corresponding protected memory region 212. In one example, one protection bit is assigned to each region of memory based on the protection bit management scheme as previously described with respect to FIG. 1.

To regulate load/store access to a particular protected memory region 212, the commit 208 stage receives protect bits 202 and enables or disables access to a particular protected memory region 212 in accordance with the status the corresponding bit of the protect bits 202. For example, whenever the protect bits 202 are set, all read and write (e.g., load/store) access to the corresponding protected memory regions 212 are disabled. In effect, when the protect bits 202 are set, the connection between the commit 208 stage and protected memory region 212 is disabled. The connection between commit 208 stage and the unprotected memory region 210, however, remains enabled. In other words, the protect bits 202, once set, disable load/store access to regions of the memory designated as protected by the SoC provider.

Additionally, when the protect bit 202 is set for a particular protected memory region 212, any attempt to access that protected memory region 212 generates an exception in accordance with a code protection usage mode for the particular SoC or particular protected memory region. The exception, for example, may include one or a combination of a vector name, vector offset, vector number, cause code, parameter, or ECR value. The code protection usage mode specifies specific protection rules that apply for a group of memory references in the memory map 106. For example, in accordance with a first code protection usage mode, a protection violation exception is raised if any coexistent protection scheme detects a protection violation. In the case where multiple protection schemes raise exceptions that occur simultaneously or at substantially the same time, the exceptions share the same vector and cause code. Each protection scheme, however, may be distinguishable for reporting purposes. For example, in the case where code protection coexist with stack checking, each protection scheme sets its own distinct bit in a 8-bit parameter, where bit 0 of the 8-bit parameter corresponds to code protection violations; bit 1 corresponds to stack checking violations; bit 2 corresponds to MPU permission violations; bit 3 corresponds to MMU permission violations.

Figure 3:
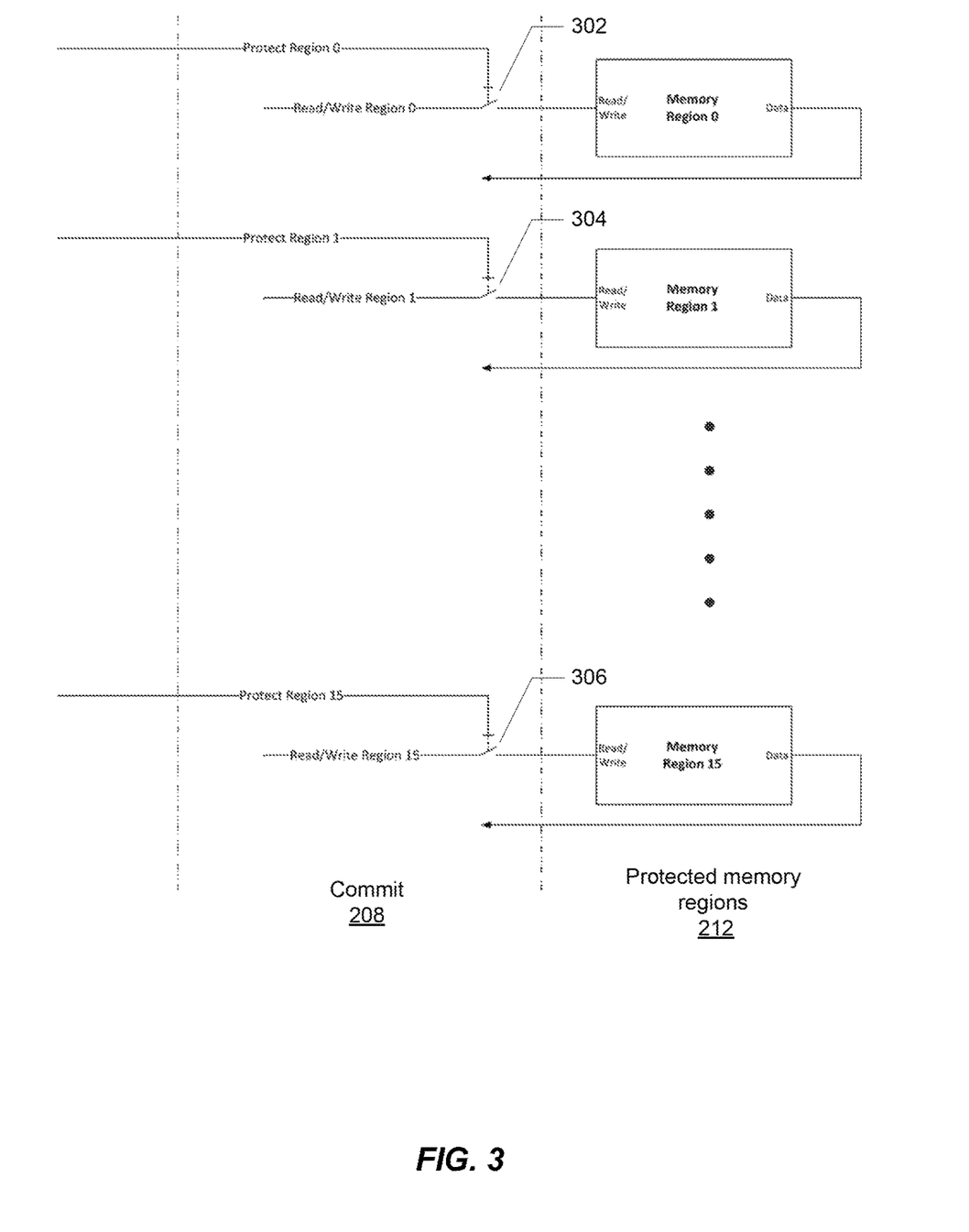
FIG. 3 illustrates in greater detail a block diagram of the functional architecture of the processor pipeline and protected memory regions of a code protection scheme for a processing device, according to an embodiment.

FIG. 3 illustrates in greater detail a block diagram of the functional architecture of the commit 208 stage and protected memory regions 212 of a code protection scheme for a processing device. As shown in FIG. 3, the commit 208 stage includes multiples switches (e.g., switches 304, 304, and 306) that regulate load/store access to protected memory regions 212. Each switch has an input coupled to a read/write signal corresponding to a particular protected memory region and an output coupled to circuitry that enables read/write access to that respective protected memory region. The switch state (e.g, enabled/disabled) is determined by the value of the protection bit associated with the particular protected memory region. For example, the state of switch 302 is determined based on the value of protect bit for region 0. Thus, if the protect bit for memory region 0 is enabled (e.g., switch 302 is open), a load/store operation directed to the protected memory region 0 is disabled. The switches 302, 304, and 306 may be implemented in combinational logic or gates to perform the operation described above. For example, the switch 302 may be implemented as a two input AND gate with one input coupled to the output of an inverter. In this example, the input of the inverter is coupled to the protect bit for the memory region 0. The other input of the AND gate is connected to the signal labeled Read/Write Region 0. In this example, as long as the protect bit for region 0 remains enabled (i.e., a logic high (or "1")), the output of the inverter will remain a logic low (or "0"), which causes the output of the AND gate to remain a logic "0" as well.

Figure 4:
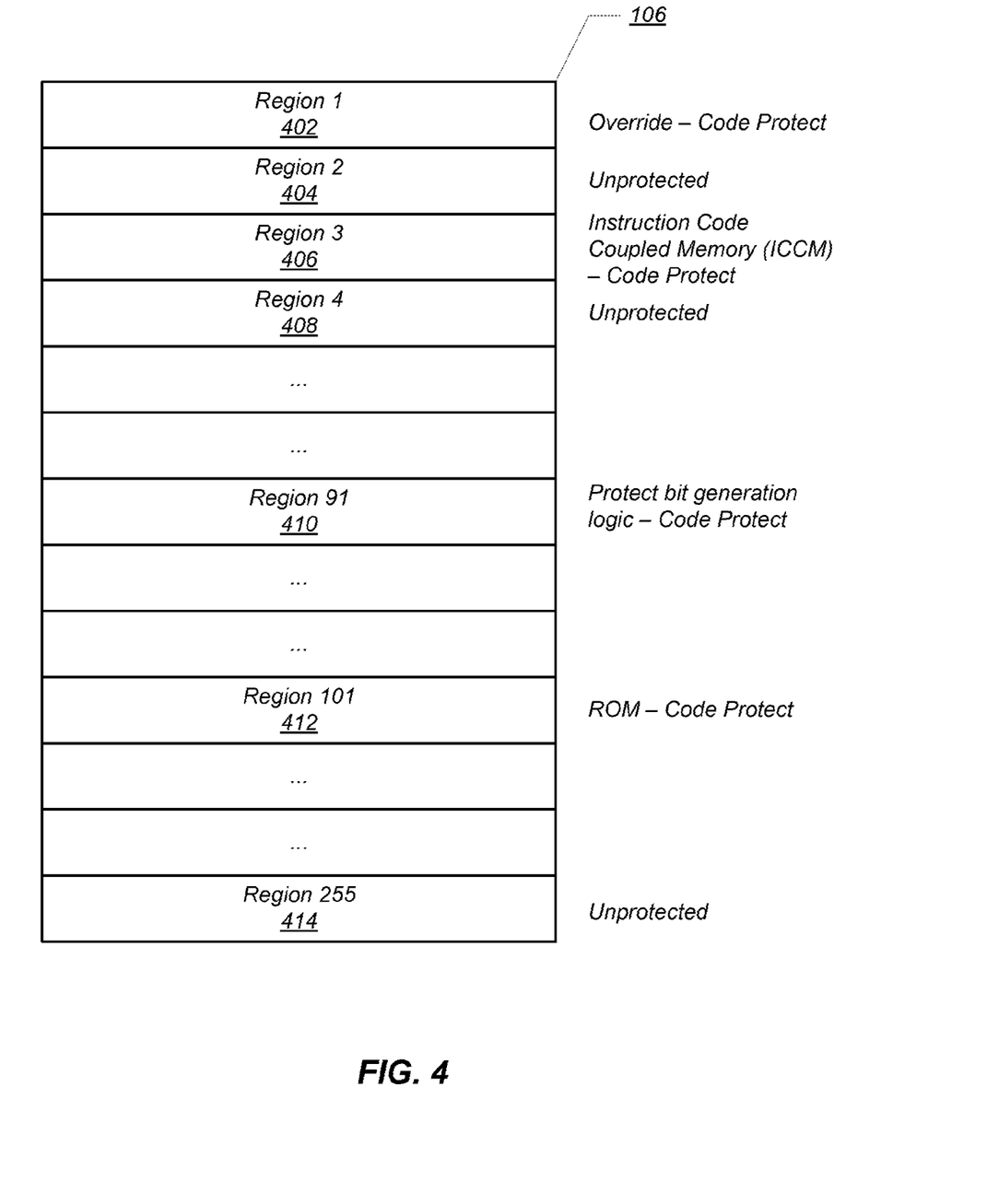
FIG. 4 illustrates in greater detail a block diagram of a memory map of a code protection scheme for a processing device, according to an embodiment.

FIG. 4 illustrates an example in greater detail a block diagram of a memory map of a code protection scheme for a processing device. As shown in FIG. 4, the memory map 106 may be partitioned into multiple regions designated by the SoC provider as either protected or unprotected. In one example, the memory map 106 is partitioned into two hundred and fifty-six regions. Each region may be associated with a protect bit, having a value indicating whether or not the respective memory region is protected or unprotected. As shown in FIG. 4, memory regions 2, 3, 4, and 255 are designated as unprotected. Memory regions 1, 3, 91, and 101 are designated as protected and include code that is either vendor code susceptible to piracy or malware attacks, code associated with management of the protect bits (e.g., code for dynamic protect bit generation or fuse logic to generate protect bits), or exception/interrupt handling.

Figure 5:
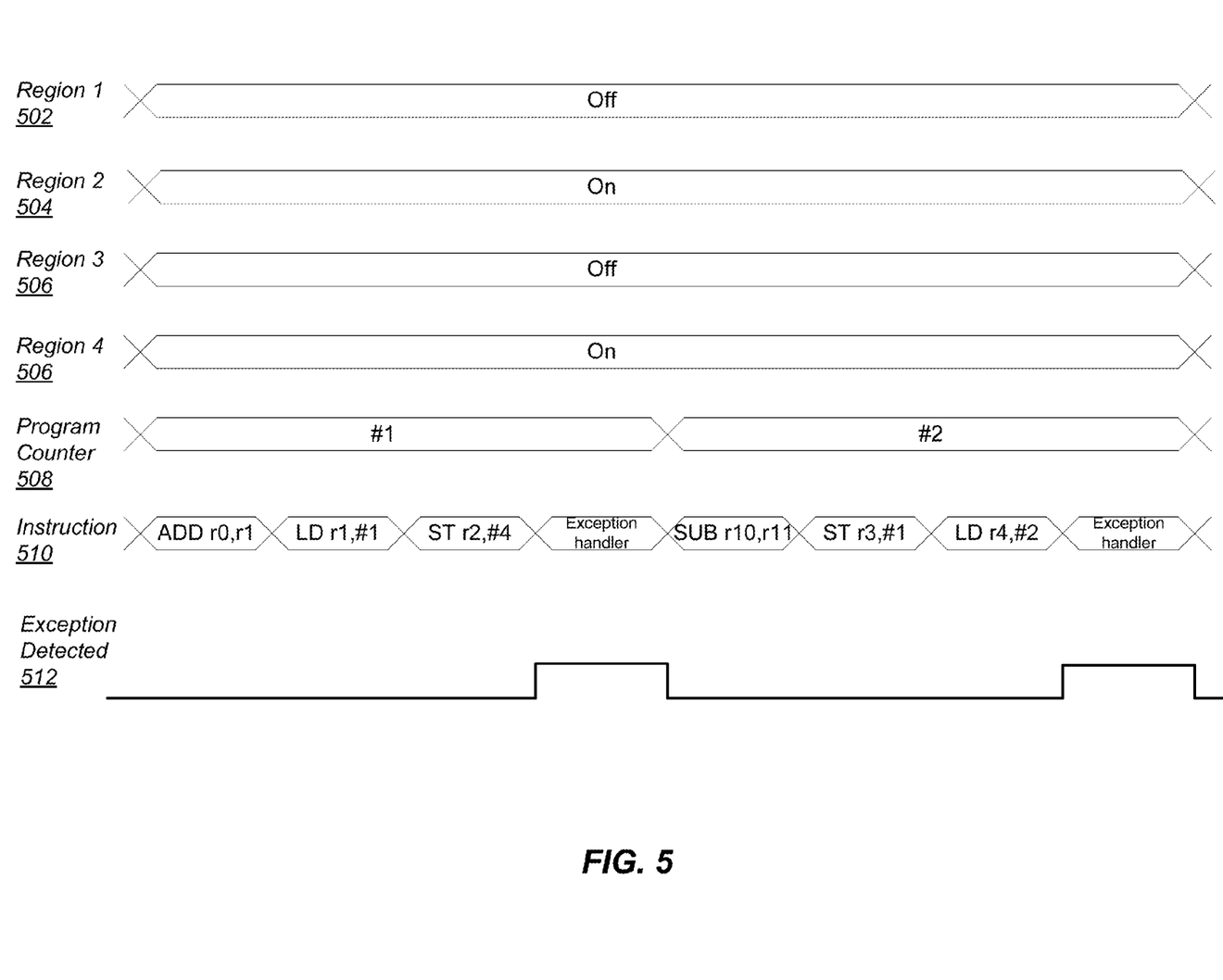
FIG. 5 illustrates operational waveforms of the code protection system of FIG. 1, according to an embodiment.

FIG. 5 illustrates operational waveforms of the code protection system of FIG. 1. The operational waveforms shown in FIG. 5 illustrate the operation of a code protection system having a memory space partitioned into four regions. The signal waveforms labeled regions 1-4 indicate the value of the protection bit associated with the respective memory region. For example, regions 1 and 3 are labeled as OFF, and thus are designated as unprotected memory regions. The OFF state reflects the value of the protect bit associated with the regions 1 and 3 as being disabled. Regions 2 and 4 are labeled ON, and thus are designated as protected memory regions. The ON state reflects the value of the protect bit associated with regions 2 and 4 as being enabled. The value indicated by the signal waveform labeled program counter 508 indicates the region of memory where the code is executed from during that period of time. For example, code is executed from region #1 followed by region #2. Instructions (i.e., code) can be executed from any memory region, and in any order.

The waveform labeled instructions 510 indicates the type of instruction executed at a given period. For a load or store instruction, the instruction is formatted as LD/ST rx, #n. Where LD represents a load instruction, ST represents a store instruction, and rx represents register "x" from/to region "n." Instructions labeled ADD, SUB, CMP correspond to instructions add, subtract, and compare, respectively, which are non-load/store instructions. Instructions labeled exception handler indicate that the previous instruction caused and exception. As previously discussed, an exception is generated responsive to an attempt to execute a load/store instruction directed to a protected memory region.

The signal waveform labeled exception detection 512 transitions from a logic low (or "0") to a logic high (or "1") responsive to the occurrence of an exception handler on signal waveform 510.

As shown in FIG. 5, according the first instruction, moving from left to right across FIG. 5, the processing element 102 adds the values stored in register 0 and register 1. Because an ADD is a non-load/store instruction, the state of the code protection scheme does not prohibit execution of the ADD instruction. The following instruction is a load/store instruction that operates, from the perspective of the processing element 102, to load the instruction from register 1 into memory region #1. This load instruction is permitted because memory region #1 is labeled OFF, and thus is designated as unprotected. The following instruction, ST r2, #4, is a store instruction, operative if executed to store the value in register 2 into memory region #4 (e.g., a potential malware attempt to write to protected memory region #4.) In this case, memory region #4 is labeled ON, and thus is protected. Accordingly, the store instruction indicated in the third instruction is not permitted, and causes an exception handler to be generated in the next instruction cycle. The exception handler may indicate an attempt to store data to a protected memory region exception while executing from and unprotected memory region. This is true even if the vendor having code stored in memory region #4 attempted to write to memory region #4. Similarly for the sixth instruction, LD r4, #2, which is operative, if executed by the processing element 102, to load into register 4 the value stored in memory region #2 (e.g., piracy attempt to read the code stored in protected memory region #2.) In this case, memory region #2 is labeled ON, and thus is protected. Accordingly, the store instruction indicated in the sixth instruction is not permitted, and causes an exception handler to be generated in the next instruction cycle. The exception handler may indicate a load to a protected memory region exception while executing from and protected memory region. This is true even if the vendor having code stored in memory region #2 attempted to read from memory region #2.

Additional Considerations

The disclosed configuration beneficially provides protection against piracy and malware for information stored in areas of memory designated as protected regions. To reduce area and power consumption, the disclosed configurations are implemented in the processor pipeline. For example, in one configuration the disclosed code protection system integrates the operation of regulating load/store access to a protected region of memory into one of the pipeline stages. The integration includes minimal use of additional combinational logic and the use of protect bits associated with each region of the memory space. When the protect bits are enabled, read and write operations directed to a corresponding protected memory region are not permitted by another host processor or debugger. The protection bits may be set by the SoC provider according to the particular design requirements. This flexibility provides a configurable code protection system that is area and power efficient compared to other code protection solutions that use a separate protected memory space or dedicated embedded hardware that operates as a trust memory management unit (MMU) to provide code protection.

The disclosed embodiments cover the implementation of the code protection features during the configuration of a processor core. For example, the disclosed embodiments cover a computing system that includes code operable to select whether to configure a processor core to incorporate the disclosed code protection features based on a selection received by the computing system. As such the disclosed embodiments cover a computer readable medium that includes code that when executed by a processor implements such a development tool to select whether to configure a processor core to incorporate the disclosed code protection features. The disclosed embodiments also cover the electrical representation of the processor core that incorporates the disclosed code protection system, which may be output from such a development tool. The disclosed embodiments further cover a computing device that instantiates a circuit representation of the disclosed code protection system.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and symbolic representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. This includes code executed by a computer process for configuring the processing element and SoC components, for synthesizing circuit description language, such as register transfer language (RTL) or hardware description language (HDL) corresponding to the components of the disclose code protection system embodiments described herein. This further includes code executed by a computer process for generating any portion of the disclosed embodiments as a placed and routed design or design layout format (e.g., graphic data system II or GDS II).

The disclosed embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The disclosed embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments is intended to be illustrative, but not limiting in scope, as set forth in the following claims.

What is claimed is:

1. An integrated circuit comprising a memory and a processor, the memory comprising one or more memory regions and the processor comprising:
    a protection bit management element configured to receive protection setting information from a secured bus and generate protection information that specifies a unique protection bit corresponding to a memory region of the one or more memory regions;
    a plurality of processing stages for processing instructions retrieved from the memory; and
    a commit processing stage, of the plurality of processing stages configured to:
    receive address information from a previous processing stage of the plurality of processing stages, the address information identifying a protected memory region of the one or more memory regions;
    determine the protection state of the protected memory region in accordance with a corresponding protection bit derived from the protection information;
    control a state of one or more switches included in the commit processing stage based at least in part on the determined protection state for the protected memory region; and
    regulate access to the protected memory region using the one or more switches.

2. The integrated circuit of claim 1, wherein the protected memory region is associated with an instruction received from the previous processing stage.

3. The integrated circuit of claim 2, wherein the commit processing stage is further configured to control the state of the one or more switches included in the commit processing stage based at least in part on an instruction type of the instruction received from the previous processing stage.

4. The integrated circuit of claim 3, wherein, for an instruction received from the previous processing stage having a memory access type, the commit processing stage is configured to have the one or more switches in a first state to disable access to the protected memory region when the determined protection state for the protected memory region is set, and have the one or more switches in a second state to enable access to the protected memory region when the protection state for the protected memory region is not set.

5. The integrated circuit of claim 3, wherein, for instructions having a memory access type, the commit processing stage is configured to:
    disable access to the protected memory region when the protection state assigned to the protected memory region is set; and
    generate an exception based on a code protection usage mode of the protected memory region.

6. The integrated circuit of claim 1, wherein the protection bit management element is comprised of circuit elements shared with other portions of the integrated circuit.

7. The integrated circuit of claim 1, wherein the commit processing stage is further configured to regulate access to the protected memory region using the one or more switches by permitting load and store access to the protected memory region when the corresponding protection bit has a first state.

8. The integrated circuit of claim 1, wherein the commit processing stage is further configured to regulate access to the protected memory region using the one or more switches by not permitting load and store access to the protected memory region when the corresponding protection bit has a second state.

9. The integrated circuit of claim 1, wherein the integrated circuit is configured to modify the protection setting information for the protected memory region when the processor is an idle state.

10. A method of controlling access to one or more regions of a memory in an integrated circuit, the integrated circuit comprising an instruction pipeline comprised of a plurality of processing stages, the method comprising:
    receiving protection setting information from a secured bus;
    generating protection information that specifies a unique protection bit corresponding to a memory region of the one or more memory regions;
    receiving by a commit processing stage, of the plurality of processing stages, address information from a previous processing stage of the plurality of processing stages, the address information identifying a protected memory region of the one or more memory regions;
    determining the protection state of the protected memory region in accordance with a corresponding protection bit derived from the protection information;
    controlling a state of one or more switches included in the commit processing stage based at least in part on the determined protection state; and
    regulating access to the protected memory region using the one or more switches.

11. The method of claim 10, wherein the protected memory region is associated with an instruction received from the previous processing stage.

12. The method of claim 11, further comprising controlling a state of one or more switches included in the commit processing stage based at least in part on an instruction type of the instruction received from the previous processing stage.

13. The method of claim 12, wherein, for an instruction received from the previous processing stage having a memory access type, setting the one or more switches in a first state to disable access to the protected memory region when the determined protection state for the protected memory region is set, and setting the one or more switches in a second state to enable access to the protected memory region when the protection state for the protected memory region is not set.

14. The method of claim 13, further comprising, for instructions having a memory access type:
    disabling access to the protected memory region when the protection state assigned to the protected memory region is set; and
    generating an exception based on a code protection usage mode of the protected memory region.

15. The method of claim 10, wherein the protection bit management element is comprised of circuit elements shared with other portions of the integrated circuit.

16. The method of claim 10, further comprising modifying, by the integrated circuit, protection information settings for the protected memory region when the processor is an idle state.

17. The method of claim 10, further comprising regulating access to the protected memory region using the one or more switches by permitting load and store access to the protected memory region when the corresponding protection bit has a first state.

18. The method of claim 10, further comprising regulating access to the protected memory region using the one or more switches by not permitting load and store access to the protected memory region when the corresponding protection bit has a second state.

\* \* \* \* \*

UNITED STATES PATENT AND TRADEMARK OFFICE
CERTIFICATE OF CORRECTION

PATENT NO. : 9,715,463 B2
APPLICATION NO. : 15/339859
DATED : July 25, 2017
INVENTOR(S) : Pranab Bhooma, Carlos Basto and Kulbhushan Kalra It is certified that error appears in the above-identified patent and that said Letters Patent is hereby corrected as shown below:

In Column 9 Claim 1, Line 31: replace "determine the protection state of the protected memory" with -- determine a protection state of the protected memory --.

In Column 10 Claim 9, Line 16: replace "is an idle state." with -- is in an idle state. --.

In Column 10 Claim 10, Line 31: replace "determining the protection state of the protected memory" with -- determining a protection state of the protected memory --.

In Column 10 Claim 15, Lines 65–66: replace "wherein the protection bit management element is comprised" with -- wherein receiving protection setting information from a secured bus is via a protection bit management element comprised --.

In Column 11 Claim 16, Lines 3–4: replace "is an idle state." with -- is in an idle state. --.

Signed and Sealed this
First Day of May, 2018

Andrei Iancu
*Director of the United States Patent and Trademark Office*